Patented Jan. 3, 1950

2,493,483

UNITED STATES PATENT OFFICE 2,493,483

MARINE ENGINE LUBRICANT

Charles E. Francis and Robert C. Jones, Martinez, Calif., assignors to Shell Development Company, San Francisco, Calif., a corporation of Delaware No Drawing. Application April 26, 1948, Serial No. 23,401

4 Claims. (Cl. 252—33.4)

This invention relates to lubricating compositions and more particularly to compounded lubricants which are effective in the presence of steam, i. e., are suitable for use in the lubrication of marine engines and the like. More particularly this invention pertains to lubricating compositions especially suitable for steam engines in which the steam condensate is not recovered.

A lubricant suitable for use in marine engines, wherein the steam condensate is not recovered, must be capable of forming water-in-oil emulsions in order to effectively lubricate the various engine parts. This is due to the fact that in such a lubricant the amount of steam or moisture is generally present in such large quantities that the oil is quite incapable of completely displacing the moisture from the metal surface, and, even if the lubricant is momentarily capable of doing this, it in turn would be readily washed away by the continued presence of additional quantities of steam. The presence of moisture on engine surfaces not only tends to cause excessive scarring, but corrosion as well.

Therefore, much more effective lubrication is attained under lubricating conditions when a lubricant is used which is capable of rendering the moisture present in such systems harmless by forming stable water-in-oil emulsions. This can be accomplished by removing the moisture from metal surfaces by forming an emulsion by means of suitable additive agents, which in addition possess corrosion and oxidation inhibiting properties, and also form on said surfaces a protective lubricating film.

In addition to the properties enumerated above, a steam engine lubricant, due to the elevated temperatures to which it is subjected, must not only have high heat resisting qualities, but must also be capable of effectively conducting heat away from the bearing surfaces. A thermally unstable lubricant is most undesirable for it tends to form carbon deposits which may cause clogging and plugging of an engine system and decrease the operating efficiency of the engine.

The desirability of a lubricant to form a stable emulsion is particularly preferred for the lubrication of external parts of steam engines, such as the crank pins, crossheads and guides, bearings, and the like, which are exposed to large quantities of moisture.

At this point, it might be appropriate to point out that the problem of marine engine lubrication is not the same as that encountered in steam cylinder lubrication, wherein it is desired to recover the steam condensate for further use. In such cases it is desired that the lubricant possess demulsifiable properties or be capable of rapidly forming an invert emulsion with steam so that oil carried over with the steam can separate readily from the exhaust steam. This invention is not concerned with this type of lubrication but with lubrication of marine engine wherein the lubricant is capable of forming a stable emulsion.

It is an object of this invention to provide a lubricant having greater utility when in the presence of steam. It is another object of this invention to provide a lubricant for use in the presence of large amounts of steam. Another object of this invention is to provide an oil composition that can readily form a stable emulsion. Still another object of this invention is to provide a water-in-oil lubricating emulsion for marine engines. Still another object of this invention is to provide a lubricating composition which is capable of protecting and lubricating surfaces in the presence of steam and water. A further object of this invention is to provide a lubricating composition which is thermally stable, and is capable of resisting oxidation and inhibiting corrosion under conditions encountered in marine engine lubrication. Still other objects of this invention will become apparent from the following description of the present invention.

It has now been discovered that an excellent lubricating composition suitable for marine engine lubrication and which is capable of forming a stable water-in-oil emulsion can be obtained by blending, with a suitable liquid hydrocarbon or synthetic lubricant base, minor amounts of two primary additives. One of these additives is a glyoxalidine, or derivative thereof which may be regarded as a dehydration product of certain amides, and may be obtained by reacting polyamines with a higher carboxylic acid at an elevated temperature. The other primary additive is either a salt of a sulfonic acid of the type $R-(SO_3H)_n$ wherein R is an organic radical and $n$ is a whole number, or a salt of an acid of the sulfuric acid ester type, $RXSO_3H$, wherein R is an organic radical and X stands for an oxygen atom or a carboxylic radical, the $SO_3H$ radical being linked to the said carboxylic radical either directly or through a side chain substituent.

Under certain severe and adverse lubricating conditions one or more secondary additives may be added to further improve compositions of this invention. These secondary additives may comprise or consist of esterified polyhydric alcohols wherein it is preferred that said polyhydric alcohol be esterified only to the mono stage. However, the polyhydric alcohol can be esterified still further, if desired, provided at least one free hydroxy group remains. Also, a minor amount of a fixed fatty oil, fractions or derivatives thereof, such as their glycerides, fatty acids, sterols, phosphatidic materials and the like, may be used in lieu of or in combination with the above esters.

The base for additives of this invention can be any liquid petroleum oil suitable for marine engine lubrication. When a straight hydrocarbon oil is used, it preferred that it have a viscosity of from about 40 to about 100 SUS at 210° F. The hydrocarbon derived from an oil may be paraffinic, naphthenic, Mid-Continent or Coastal stock and/or a mixture thereof. The natural hydrocarbon oils may be blended with synthetic lubricants, such as polymerized olefines, copolymers of alkylene glycols and alkylene oxides, organic esters, e. g. 2-ethyl hexyl sebacate, dioctyl phthalate, trioctyl phosphate, polymeric tetrahydrofuran, polyalkyl silicon polymers and the like, or the synthetic lubricants may be used in place of the natural hydrocarbon oil. The base oil generally may be used in amounts of from about 92% to 99.94% and preferably from about 98% to about 99.94%.

One of the primary additives of this invention, namely a glyoxalidine and a derivative of a glyoxalidiene may be prepared by reacting a polyamine or a hydroxy alkyl alkylene polyamine with a higher carboxylic acid at an elevated temperature of about 120° C. and preferably at between about 225° C. and about 300° C.

Instead of carrying out the reaction at the above temperature range a much lower reaction temperature may be employed so that the degree of dehydration does not proceed to such an extent as to produce glyoxalidines, but the temperature and reaction is so controlled that only one mol of water is allowed to split out during the reaction, thus resulting in the formation of an amidol type compound, which may be neutralized with an organic mono- or polycarboxylic acid such as maleic acid or the like to form a salt. It is preferred, however, to carry out the reaction to such a degree that a glyoxalidine or its derivative is formed.

The polyamines which are used to prepare a glyoxalidine may be represented by the general formula:

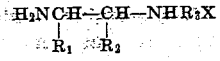

wherein $R_1$ represents hydrogen or $R_1$ and $R_2$ can represent hydrogen or a lower alkyl group and $R_3$ represents an alkylene group, a lower alkyl substituted alkylene group, or a radical of the structure $-CHR_1CHR_1(NHCHR_1CHR_1)_y-$ wherein $R_1$ also represents hydrogen or a lower alkyl group and $y$ is an integer, and X represents an OH, SH, SeH, TeH, $NH_2$ group or an aminoalkylene substituent imino group. Specifically, the polyamines which can be used are: ethylene diamine, diethylene triamine, triethylene tetraamine, tetraethylene pentamine, tetramethyl methylene diamine, propylene diamine, dipropylene triamine, tripropylene tetramine, N-n-dodecyl diethylene triamine, N-octyl ethylene diamine, hydroxy ethyl ethylene diamine, hydroxy isopropyl propylene diamine, hydroxy ethyl diethylene triamine, hydroxy ethyl triethylene, N-beta-hydroxypropyl propylene diamine and the like.

Acids which are reacted with the above polyamines to form glyoxalidines may include: capric, nonanoic, hendecanoic, lauric, n-tridecanoic, myristic, pentadecanoic, palmitic, margaric, stearic, arachidic, behenic, heneicosoic, lignoceric, pentacosic, cerotic, montanic, palmitoleic, oleic, gadoleic, erucic, cetoleic, myristoleic, lanopalmic, hydroxy stearic, dihydroxy stearic, ricinoleic, linoleic, elaidic, linolenic, clupanodonic acids and the like. In addition, fatty acids obtained from animal, vegetable and fish oils can be used and may be exemplified by such oils as: cocoanut oil, palm kernel oil, rape oil, linseed oil, soya bean oil, sunflower oil, perilla oil, tung oil, whale oil, cod and cod liver oil, marine animal oil, various fish oils such as herring oil, sardine oil and the like. Instead of using free fatty acids, their salts, esters or amide can be used.

The reaction between a polyamine and a fatty acid to form a glyoxalidine is carried out under such conditions as to effect the splitting out of water in excess of 1.5 mols for each mol of free fatty acid used.

The following examples will serve to illustrate how a glyoxalidine may be prepared:

One mol of beta-hydroxy ethyl ethylene diamine was mixed with 0.5 mol of oleic acid and heated under reflux until a temperature of about 270° C. was reached. The water formed during the reaction period was removed as well as excess amine and the product formed namely, 1-hydroxyethyl-2-hexadecenyl glyoxalidine was purified by vacuum distillation.

Another glyoxalidine was prepared by reacting one mol of oleic acid with three mols of triethylene tetramine in a suitable vessel until the temperature reached around about 300° C. Water was removed as well as excess triethylene tetramine and the remaining product was 1-(aminoethylimino)-2-heptadecyl glyoxalidine.

Other specific glyoxalidines which are preferred for use in compositions of this invention are:

1-amino ethyl 2-heptadecenyl glyoxalidine
1-amino ethyl 2-heptadecyl glyoxalidine
1-amino ethyl 2-undecyl glyoxalidine
1-amino isopropyl 2-heptadecenyl-5-methyl glyoxalidine
1-amino isopropyl 2-heptadecyl-5-methyl glyoxalidine
1-hydroxy ethyl-2-heptadecyl glyoxalidine
1-hydroxy ethyl-2-undecyl glyoxalidine
1-hydroxy isopropyl-2-heptadecenyl - 4 - methyl glyoxalidine A glyoxalidine which has a free amino group may be reacted with an acid to form a salt. A glyoxalidine having free hydroxy group or another substituent group can be esterified, with either inorganic or organic mono or polycarboxylic acids or reacted with a salt forming compound to form a salt or soap with an alkali, alkaline earth metal or ammonium, amine or quaternary ammonium compound.

The amount of glyoxalidine compound or derivative thereof which is used in compositions of this invention may vary from less than 0.15% and up to about 1.0% depending upon the conditions of use, the presence of other additives and the like. The preferred range however is between about 0.05% and about 0.3%.

The other primary additives of this invention are organic sulfonate or sulfate obtained from petroleum sulfonic acids such as the mahogany acids or green acids produced in the manufacture of medicinal oils or refinement of lubricating oils by treatment with fuming sulfuric acid, oleum, chlorosulfonic acid, sulfur trioxide, etc.; or the sulfo compounds may be derived from various aliphatic, alicyclic or aromatic sulfonic acids, such as alkylated benzenes, diphenyls, xylenes, diphenyl methanes, tetralines, naphthalenes, anthracenes, phenanthrenes, alkyl phenolic compounds, alkylated halo aromatic compounds, e. g. chlorinated diphenyl oxides, diphenyl sulfides, diphenyl amines, naphthyl amine, diphenyl sulfides, phenyl naphthyl amines or the oxides or the sulfides; alkylated pyridines, quinolines, isoquinolines, pyrral, pyrolidines, piperidine, thiophenes, thiophanes, etc.; or of various sulfonic acids of carboxylic acid esters or amides; acids of the sulfuric acid ester type such as Turkey red oil, sulfated fish oils, sulfate acids or mono ester of sulfuric acid obtained by treatment with strong sulfuric acid, various olefines or alcohols such as the long chain olefines obtained in the vapor phase cracking of wax at about 550° C., polymers obtained by polymerization of normally gaseous olefines with inorganic polyoxy acids or Friedel-Crafts catalysts; fatty or naphthenic alcohols obtained in the catalytic reduction of fatty or naphthenic acids; alcohols obtained by condensation of ketones or aldehydes followed by hydrogenation; or alkyl aromatic mono esters of sulfuric acid, etc. The above compounds may contain substituent groups such as halogen, hydroxy, hydrosulfide, ether, amino, imino, sulfide, carboxyl ester, etc.

Any of the above referred to acids may be neutralized with alkali, alkaline earth, ammonia, or organic nitrogen bases to form salts thereof. Preferred are the sodium potassium, calcium, barium, magnesium, ammonium and amine salts of the following specific sulfo acids: benzene sulfonic acid, toluene sulfonic acid, tri-isopropyl naphthalene sulfonic acid, polyamyl naphthalene sulfonic acid, diwax benzene sulfonic acid, oil-soluble petroleum sulfonic acid derived from various petroleum fractions, such as gas oil, kerosene, turbine oil, heavy oil, lubricating oil, petrolatum and mixtures thereof. In addition, sodium lauryl sulfate, sodium oleyl sulfate, ammonium lauryl sulfate and other alkali salts of sulfated alcohols having between about 8 to 20 carbon atoms in the molecule may be used.

The salts of the sulfo acids may be replaced in part or under certain conditions may be substituted by salts of lauric, palmitic, stearic, oleic, linoleic, ricinoleic acids, oxidized paraffin acids, tall oil acids, rosin acids, abietic acid, wool fat acid, naphthenic acid, alkylated benzoic and naphthoic acids, aromatic fatty acids such as phenyl acetic to phenyl stearic acid, terpenic acids and the like.

The amount of a salt of a sulfo acid or mixtures of said salts with salts of other type acids which can be used in compositions of the invention may vary from about 0.01% to about 1.0% and preferably is used in amounts varying from about 0.01% to about 0.2%.

One of the secondary additives of this invention are partial esters of polyhydric alcohols, said esters having at least one free hydroxyl radical. Preferably at least one hydroxyl radical should be on a terminal carbon atom but it may be removed from such terminal carbon atom by as many as three or four carbon atoms. To this alcoholic portion of the molecule there is attached a predominantly hydrocarbon portion containing a number of carbon atoms sufficient to give the molecule a total minimum carbon content of about 12 and preferably about 15 to 46 carbon atom. This hydrocarbon portion is attached to the alcoholic portion of the molecule through an ester linkage which may be formed between the hydroxy or an acid radical (if there is one) of the polyhydric alcohol on the one hand, and an acid or alcohol respectively on the other.

The partial ester may be derived from glycerine, erythritol, pentaerythritol, mannitol, sorbitol, sorbitan, etc. The acid (or alcohol, as the case may be) forming the ester with the polyhydric alcohol should have at least about 10 and preferably between about 10 to 40 carbon atoms, in the form of an aliphatic or cyclo aliphatic radical. Suitable radicals comprise, for example, capryl, decyl, undecyl, undecylenyl, lauryl, myristyl, palmityl, palmtolenyl, oleyl, elaidyl, crucyl, stearyl, abictyl, etc. Radicals such as are contained in the acids obtained from rosin or tall oil as well as naphthenic acids having the requisite number of carbon atoms are also applicable. Specific esters are: glyceryl mono and dioleate, glyceryl mono and distearate, sorbitan mono, di and trioleate, sorbitan mono, di and tri-stearate, glyceryl mono and di-ricinoleate, mannitan mono laurate, mannitan mono-oleate, pentaerythritol mono-oleate, pentaerythritol mono-stearate, glycerine mono ester of soya bean fatty acids, pentaerythritol monocaprylate, polymerized partial esters of glycol laurate, oleate ricinoleate, and stearate, etc. These esters may be modified by hydrogenation and the like, if desired. The amount of said partial ester alcohol which can be used in compositions of this invention may vary between about 0.05 to about 1.0% and preferably between about 0.1% and 0.5%.

The other secondary additive which can be used comprises a fixed fatty oil, fractions and derivatives thereof, such as their glycerides, fatty acids, sterols, phosphatides and the like. The fatty oil or its derivatives may be of animal, vegetable and/or marine origin, said oils may, if desired, be blown, polymerized, hydrogenated, and treated by various other means to improve their lubricating properties and compatibility with other additives of this invention. Oils and fractions of said oils which are suitable for use include: tallow, lard oil, bone oil, neat's-foot oil, wool fat, horse foot oils, castor oil, cashew nut oil, peanut oil, cocoanut oil, jojoba seed oil, olive oil, palm oil, corn oil, cottonseed oil, kapok oil, rape seed oil, ravison oil, sesame oil, sunflower oil, teaseed oil, linseed oil, oiticica oil, perilla oil, soya bean oil, tung oil, poppy seed oil, hempseed oil, codfish oil, codliver oil, dogfish oil, dolphin fish oil, herring oil, menhaden oil, porpoise oil, sardine oil, seal oil, shark oil, sperm oil, whale oil, etc.

The amount of fixed fatty oil and derivatives thereof which can be used with compositions of this invention may range from a fraction of one per cent and up to about 5.0% and generally the preferred amount used varies from about 0.1% to about 1.0%.

General formulation of compositions of this invention may be represented by:

|  | Broad Range | Limited Range |
| --- | --- | --- |
|  | Percent | Percent |
| Glyoxalidine and derivatives thereof | 0.15 to 1.0 | 0.05 to 0.1 |
| Organic sulfonate or sulfate compound | 0.01 to 1.0 | 0.01 to 0.1 |
| Base (petroleum hydrocarbon oil and/or synthetic oil) | balance | balance |

However, a more preferred composition can be represented by the following formulation:

| Primary Additive | Broad Range | Limited Range |
|---|---|---|
| | Percent | Percent |
| Glyoxalidine and its derivatives | 0.05 to 1.0 | 0.05 to 0.3 |
| Organic sulfonate or sulfate compound | 0.01 to 1.0 | 0.01 to 0.2 |
| Base (petroleum hydrocarbon oil and/or synethetic oil) | balance | balance |

| Secondary Additive | Broad Range | Limited Range |
|---|---|---|
| | Percent | Percent |
| Partial ester of a polyhydric alcohol | 0.05 to 1 | 0.1 to 0.5 |
| Fixed fatty oil and its fractions | 0.0 to 5 | 0.1 to 1.0 |

Preferred compositions of this invention may be illustrated by the following examples:

|  | Per cent |
|---|---|
| 1-hydroxy ethyl-2-heptadecenyl-glyoxalidine | 0.05 to 0.3 |
| Na petroleum sulfonate | 0.03 to 0.15 |
| Glyceryl mono-oleate | 0.1 to 1.0 |
| Blown rape seed oil | 0.5 to 1.0 |
| Mineral oil (80 to 90 SUS at 210° F.) | balance |

The following table further illustrates specific compounds of this invention, each component of which may be used in amounts as indicated in the previous example.

| Components | 1 | 2 | 3 | 4 | 5 | 6 | 7 | 8 | 9 |
|---|---|---|---|---|---|---|---|---|---|
| 1-hydroxy isopropyl-2-heptadencyl-4-methyl glyoxalidine | x | | | x | | | | | x |
| 1-amino ethyl 2-heptadecyl glyoxalidine | | | x | | x | | | | |
| 1-amino ethyl 2-heptadecyl glyoxaline | | | | | | x | | x | |
| 1-amino ethyl 2-undecyl glyoaxalidine | | x | | | | x | | | x |
| glyceryl mono oleate | x | | x | | | | | | x |
| glyceryl mono stearate | | x | | x | | | | | |
| glyceryl mono ricinoleate | | | | | | | | | |
| glyceryl di-oleate | | | | | | | x | | |
| glyceryl di-ricinoleate | | | | | x | | | | |
| sorbitan mono oleate | | | | | | | | | |
| penta-erythritol mono oleate | | | | | | | | | |
| lard oil | x | | | | | | | | |
| rape seed oil | | x | x | x | | x | | | |
| polymerized rape oil | | | | | | | | | |
| blown rape seed oil | | | | | x | | | | |
| fish oil | | | | | | | | | |
| polymerized fish oil | | | | x | | | | | |
| hydrogenated fish oil distillates | | | | | | | | | x |
| hydrogenated fish oil residuum | | | | | | | | | |
| Na petroleum sulfonate | x | x | x | | | | | | x |
| K petroleum sulfonate | | | | | | | | | |
| Ca petroleum sulfonate | | | | x | | | | | |
| Na lauryl sulfate | | | | | | | | x | |
| Na oleyl sulfate | | | | | | | | | |
| Na di-wax benzene sulfonate | | | | | | | x | | |
| Na alkyl naphthalene sulfonate | | | | | | | | | |

The above compositions can be added to a mineral oil, preferably having a viscosity at 210° F. of from 40 to 100 Saybolt or they can be admixed with blends of mineral oil and synthetic oil or a synthetic oil can be used as the base.

In order to illustrate the emulsion characteristics of compositions of this invention, these compositions were subjected to the Emulsion Test (320.14) as described in the Federal Standard Stock Catalog V V-L-791C, May 12, 1945, Section IV, and the results are tabulated below:

| Composition Per Cent Vol. | I | II | III |
|---|---|---|---|
| 1-hydroxy ethyl-2-heptadecenyl glyoxalidine | 0.07 | 0.10 | 0.1 |
| Glyceryl mono oleate | 0.20 | 0.20 | 0.2 |
| Na petroleum sulfonate | 0.04 | 0.06 | 0.08 |
| Lard Oil | 1.00 | 1.00 | |
| Mineral Oil (80-90 SUS at 210° F.) | 98.69 | 98.64 | 99.62 |
| Emulsion at 130° F. (F. B. S. 320.14) [1] | | | |
| Distilled Water | 0 | 0 | 0 |
| Synthetic sea water [2] | 0 | 0 | 0 |
| Emulsion at 180° F. (F. B. S. 320.14) | | | |

| Distilled water | O | E | W | O | E | W | O | E | W |
|---|---|---|---|---|---|---|---|---|---|
| Separation after 5 min | | 80 | | | 80 | | | 80 | |
| Separation after 10 min | 0 | 79 | 1 | | 89 | 1 | | 80 | |
| Separation after 15 min | 0 | 79 | 1 | | 79 | 1 | | 76 | 4 |
| Separation after 30 min | | 76 | 4 | −1 | 76 | 3 | | 75 | −5 |
| Separation after 60 min | | 71 | 9 | −2 | 71 | 7 | 2 | 71 | 7 |

| Synthetic sea water | O | E | W | O | E | W | O | E | W |
|---|---|---|---|---|---|---|---|---|---|
| Separation after 5 min | | 80 | | | 80 | | | 80 | |
| Separation after 10 min | | 80 | | | 80 | | | 80 | |
| Separation after 15 min | | 80 | | | 80 | | | 80 | |
| Separation after 30 min | | 80 | | | 80 | | 2 | 78 | 0 |
| Separation after 60 min | | 80 | | 2 | 78 | | 6 | 74 | 0 |

[1] Numerous results indicate separation in ml., 60 minutes after stirring. O=oil; E=emulsion; W=water.
[2] Composition of synthetic sea water: sodium chloride, 2.5 gm. per liter of aqueous solution; magnesium chloride ($6H_2O$), 11 gm. per liter of aqueous solution; sodium sulfate, 4 gm. per liter of aqueous solution; calcium chloride, 1.2 gm. per liter of aqueous solution.

As can be seen from the above test results compositions of this invention found extremely stable emulsion and are far superior to commercial marine engine oils which when subjected to the above test readily separate into different phases one being an aqueous phase and the other an oleaginous phase.

Other additives can be added to compositions of this invention in order to improve their performance. Thus, oiliness agents, oxidation inhibitors and the like can be added generally in amounts of around about 0.5 to 5% by weight.

In addition to being excellent marine engine lubricants compositions of this invention may be utilized as flushing oil, rust inhibitors, cutting fluids, rolling oils and in various other industrial applications such as cleaning compositions, coating compositions and the like.

We claim as our invention:

1. A marine engine lubricant capable of forming stable emulsions when in contact with an aqueous medium comprising from 0.05 to 1% of a glyoxalidine selected from the group consisting of hydroxy alkyl- and amino alkyl-substituted glyoxalidines; from 0.01 to 1% of a metal sulfonate selected from the group consisting of an alkali and alkaline earth metal salt of an organic sulfonic acid, the organic radical thereof being selected from the group consisting of petroleum hydrocarbon and alkyl-substituted aromatic hydrocarbon radicals; from 0.05 to 1% of a partial ester of a polyhydric alcohol and a higher fatty acid having at least 10 carbon atoms, said ester having at least one free hydroxy group; from 0.1 to 5% of a fixed fatty oil and the balance being mineral oil.

2. A marine engine lubricant capable of forming stable emulsions when in contact with an aqueous medium having the following formula:

|  | Per cent by volume |
|---|---|
| 1-hydroxy ethyl-2-heptadecenyl glyoxalidine | 0.005 to 0.3 |
| Sodium petroleum sulfonate | 0.01 to 0.2 |
| Glyceryl mono-oleate | 0.1 to 0.5 |
| Lard oil | 0.1 to 1.0 |
| Mineral lubricating oil, balance | |

3. A marine engine lubricant capable of forming stable emulsions when in contact with an aqueous medium having the following formula:

|  | Per cent by volume |
|---|---|
| 1-hydroxy ethyl-2-heptadecyl glyoxalidine | 0.05 to 0.3 |
| Sodium petroleum sulfonate | 0.03 to 0.2 |
| Glyceryl mono oleate | 0.1 to 0.5 |
| Blown rape seed oil | 0.1 to 1.0 |
| Mineral lubricating oil, balance | |

4. A marine engine lubricant capable of forming stable emulsions when in contact with an aqueous medium having the following formula:

| | Per cent by volume |
|---|---|
| 1-hydroxy ethyl-2-heptadecyl glyoxalidine | 0.05 to 0.3 |
| Sodium petroleum sulfonate | 0.03 to 0.2 |
| Glyceryl mono oleate | 0.1 to 0.5 |
| Polymerized fish oil | 0.1 to 1.0 |
| Mineral lubricating oil, balance | |

CHARLES E. FRANCIS.
ROBERT C. JONES.

REFERENCES CITED

The following references are of record in the file of this patent:

UNITED STATES PATENTS

| Number | Name | Date |
|---|---|---|
| 2,214,152 | Wilkes | Sept. 10, 1940 |
| 2,412,634 | Schwartz | Dec. 17, 1946 |
| 2,415,353 | Johnston | Feb. 4, 1947 |
| 2,434,490 | Duncan | Jan. 13, 1948 |
| 2,443,585 | Salz | June 15, 1948 |
| 2,470,537 | Waugh | May 17, 1949 |